(12) United States Patent
Lindsey

(10) Patent No.: US 12,011,002 B2
(45) Date of Patent: Jun. 18, 2024

(54) DISPENSING ROLLING PIN

(71) Applicant: David Lindsey, Arvada, CO (US)

(72) Inventor: David Lindsey, Arvada, CO (US)

(*) Notice: Subject to any disclaimer, the term of this patent is extended or adjusted under 35 U.S.C. 154(b) by 0 days.

(21) Appl. No.: 17/479,232

(22) Filed: Sep. 20, 2021

(65) Prior Publication Data
US 2022/0295801 A1  Sep. 22, 2022

Related U.S. Application Data

(60) Provisional application No. 63/163,143, filed on Mar. 19, 2021.

(51) Int. Cl.
*A21C 3/02* (2006.01)
*A23P 20/12* (2016.01)

(52) U.S. Cl.
CPC .............. *A21C 3/021* (2013.01); *A23P 20/12* (2016.08)

(58) Field of Classification Search
CPC .. A21C 3/02; A21C 3/021; A21C 9/04; A21C 9/063; A21C 11/04; A21C 11/22; A23G 3/2076; A23P 20/12; B05C 17/02; F16C 13/00; A47J 43/22
See application file for complete search history.

(56) References Cited

U.S. PATENT DOCUMENTS

| 456,042 | A | * | 7/1891 | Landrith | A21C 3/021 101/367 |
| 599,171 | A | * | 2/1898 | Fowler | A21C 3/021 7/111 |
| 1,603,683 | A | * | 10/1926 | Gale | A21C 3/021 492/14 |
| 2,673,532 | A | * | 3/1954 | Stair | A21C 3/021 492/14 |

FOREIGN PATENT DOCUMENTS

CN   111213686   *  6/2020

* cited by examiner

*Primary Examiner* — Robert J Scruggs
(74) *Attorney, Agent, or Firm* — Leyendecker & Lemire, LLC

(57) ABSTRACT

A powder-dispensing system includes a first rollable member and a second rollable member. The first rollable member has a first pressure surface, a threaded interior chamber internal to the first pressure surface and an entrance to the threaded interior chamber. The second rollable member has a second pressure surface and an interior chamber internal to the second pressure surface. A threaded exterior surface external to the interior chamber is configured for interlocking/threaded engagement with the threaded interior chamber. A plurality of perforations extend through the threaded exterior surface into the interior chamber of the second rollable member.

19 Claims, 7 Drawing Sheets

DISPENSING ROLLING PIN

CROSS-REFERENCE TO RELATED APPLICATIONS

This application claims the priority benefit of U.S. Provisional Application No. 63/163,143 filed on Mar. 19, 2021, which is incorporated herein by reference in its entirety.

SUMMARY

The disclosure describes a dispensing rolling pin. The dispensing rolling pin includes a first rollable, pressure-applying member and a second rollable, pressure-applying member. The first rollable, pressure-applying member has a first handle at a first end, a first pressure surface adjacent to the first handle, a threaded interior chamber internal to the first pressure surface and an entrance to the threaded interior chamber at a second end opposite the first end and spaced from the first handle by at least the first pressure surface. The second rollable, pressure-applying member has a second pressure surface, an interior chamber internal to the second pressure surface and, adjacent to a first end, a threaded exterior surface external to the interior chamber and configured for mating engagement with the threaded interior chamber. A plurality of perforations are provided through the threaded exterior surface into the interior chamber of the second rollable, pressure-applying member. A second handle is provided at a second end opposite the first end of the second rollable, pressure-applying member and spaced from the threaded exterior surface at least by the second pressure surface.

Further, the disclosure describes a powder-dispensing system. The powder-dispensing system includes a first rollable member and a second rollable member. The first rollable member has a first pressure surface, an interior chamber internal to the first pressure surface and an entrance to the interior chamber. The second rollable member has a second pressure surface, an interior chamber internal to the second pressure surface, an exterior surface external to the interior chamber and configured for mating engagement with the interior chamber and a plurality of perforations through the exterior surface into the interior chamber of the second rollable pressure-applying member.

Further still, the disclosure describes a method for dispensing. The method includes providing a first rollable, pressure-applying member and providing a second rollable, pressure-applying member wherein the first rollable, pressure-applying member has a first handle at a first end, a first pressure surface adjacent to the first handle, a threaded interior chamber internal to the first pressure surface and an entrance to the threaded interior chamber at a second end opposite the first end and spaced from the first handle by at least the first pressure surface and wherein the second rollable, pressure-applying member has a second pressure surface, an interior chamber internal to the second pressure surface and adjacent to a first end, a threaded exterior surface configured for interlocking engagement with the threaded interior chamber. A plurality of perforations extend through the threaded exterior surface into the interior chamber of the second rollable, pressure-applying member and a second handle is provided at a second end opposite the first end of the second rollable, pressure-applying member and spaced from the threaded exterior surface at least by the second pressure surface.

The method further includes providing a substance to the interior chamber internal to the second pressure surface, engaging the external threads with the internal threads and twisting the first rollable, pressure-applying member relative to the second rollable, pressure-applying member in a first direction until the first and second pressure surfaces form a single, continuous pressure surface and applying the single, continuous pressure surface to a substance to be spread and flattened and rolling the threadedly engaged first and second rollable, pressure-applying members over the substance. The first rollable pressure-applying member is twisted relative to the second rollable, pressure-applying member in a second direction until one or more of the perforations are uncovered, the substance is dispensed from the interior chamber through the one or more uncovered perforations and the first rollable, pressure-applying member is twisted relative to the second rollable, pressure-applying member in the first direction until the perforations are covered and the first and second pressure surfaces form the single, continuous pressure surface.

BRIEF DESCRIPTION OF THE FIGURES

The summary above, as well as the following detailed description of illustrative embodiments, is better understood when read in conjunction with the appended drawings. For the purpose of illustrating the disclosure, example constructions are shown in the drawings. However, the disclosure is not limited to specific methods and instrumentalities disclosed herein. Moreover, those having ordinary skill in the art will understand that the drawings are not to scale. Wherever possible, like elements have been indicated by identical numbers.

Embodiments of the disclosure will now be described, by way of example only, with reference to the following diagrams wherein.

DETAILED DESCRIPTION

Figure 1:
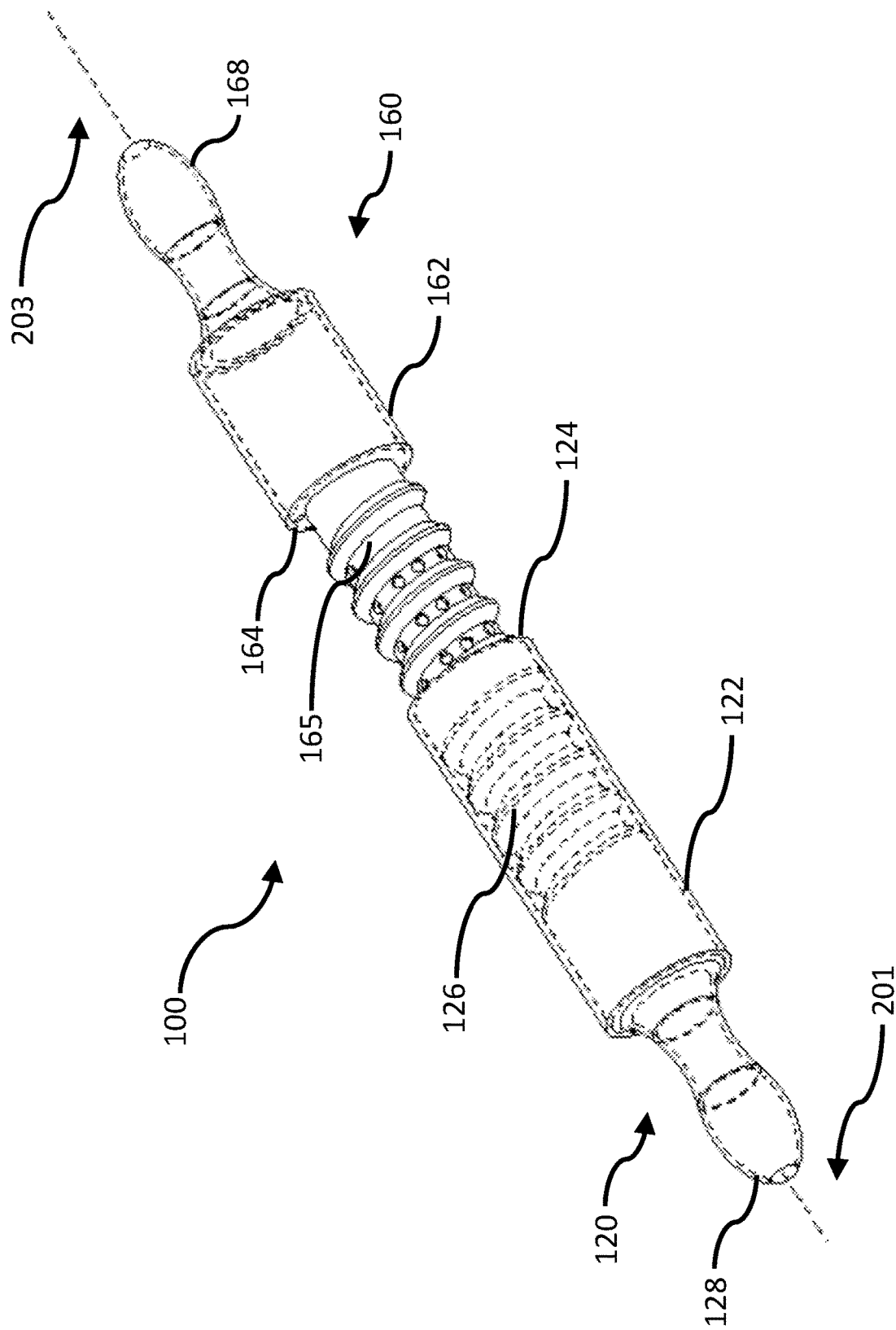
FIG. 1 illustrates a perspective view of an example dispensing rolling pin in a dispensing configuration.

The following detailed description illustrates embodiments of the disclosure and manners by which they can be implemented. Although the preferred mode of carrying out disclosed systems and methods has been described, those of ordinary skill in the art would recognize that other embodiments for carrying out or practicing disclosed systems and methods are also possible.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

In order to add flour while rolling out dough, a user with a known rolling pin will need to remove the rolling pin from the dough, add flour from a reservoir either by hand or with some spreading device and then go back to rolling out the dough. This slows down the process of forming dough, requires multiple tools and/or coats the user's hands with flour. Further, adding flour to the dough by hand may be unsanitary.

Embodiments of the disclosure provide a dispensing rolling pin enabling a user to roll dough and dispense flour directly onto the dough from a single tool—saving time and clean-up.

Additional aspects, advantages, features and objects of the disclosure will be made apparent from the drawings and the detailed description of the illustrative embodiments construed in conjunction with the appended claims that follow.

It will be appreciated that described features are susceptible to being combined in various combinations without departing from the scope of the disclosure as defined by the appended claims.

Referring now to the drawings, FIGS. 1-7 illustrate an example dispensing rolling pin 100. Dispensing rolling pin 100, which may be configured for operation as a powder-dispensing system and/or a pressure-applying system, includes a first rollable member 120 and a second rollable member 160. Each of rollable members 120 and 160 may be configured for operation as pressure-applying members.

Figure 3:
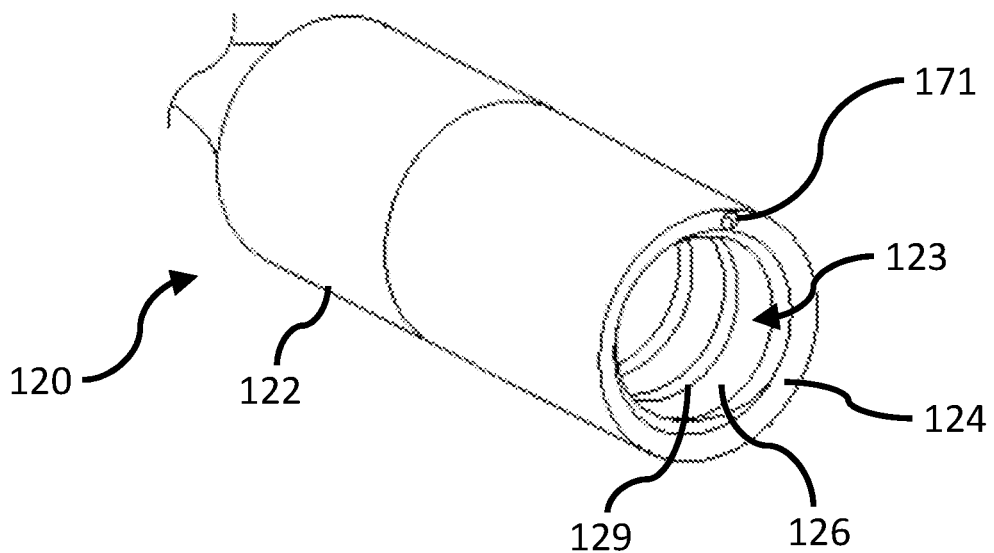
FIG. 3 illustrates a detail perspective view of a first end of first rollable member.
Figure 4:
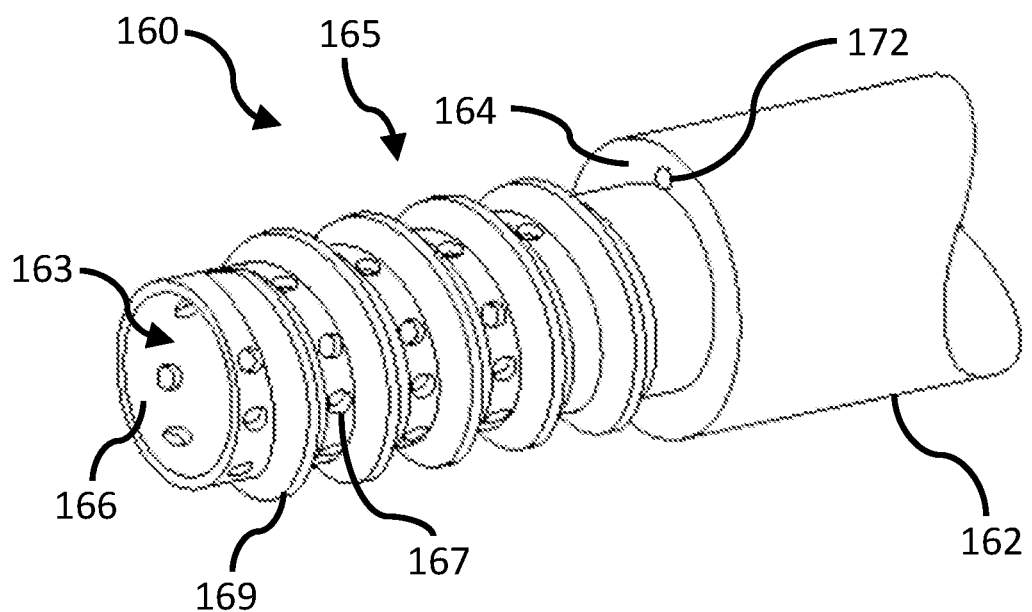
FIG. 4 illustrates a detail perspective view of a first end of second rollable member.

First rollable member 120 has a first pressure surface 122, an interior chamber 126 internal to first pressure surface 122 with an entrance 123 (FIG. 3). Second rollable member 160 has a second pressure surface 162 and an interior chamber 166 internal to second pressure surface 162 with an entrance 163 (FIG. 4). An exterior surface 165 external to interior chamber 166 is configured for mating engagement with interior chamber 126 of first rollable member 120. Exterior surface 165 may be adjacent to a first end of second rollable member 160.

Perforations or through-holes 167 extend through exterior surface 165 into interior chamber 166. Perforations 167 are configured to allow for dispensing a powder such as a flour or meal from interior chamber 166 without having entrance 163 open. Any number of perforations suitable to allow passage of sufficient material from interior chamber 166 to the exterior of system 100 may be provided. In an example, thirty perforations are provided. Any of a number of perforation sizes may be included so long as the size is suitable for allowing passage of a powder such as flour or meal therethrough while leaving sufficient material to maintain structural integrity of second rollable member 160. In an example, perforations 167 have diameters of 0.32 cm.

Figure 2:
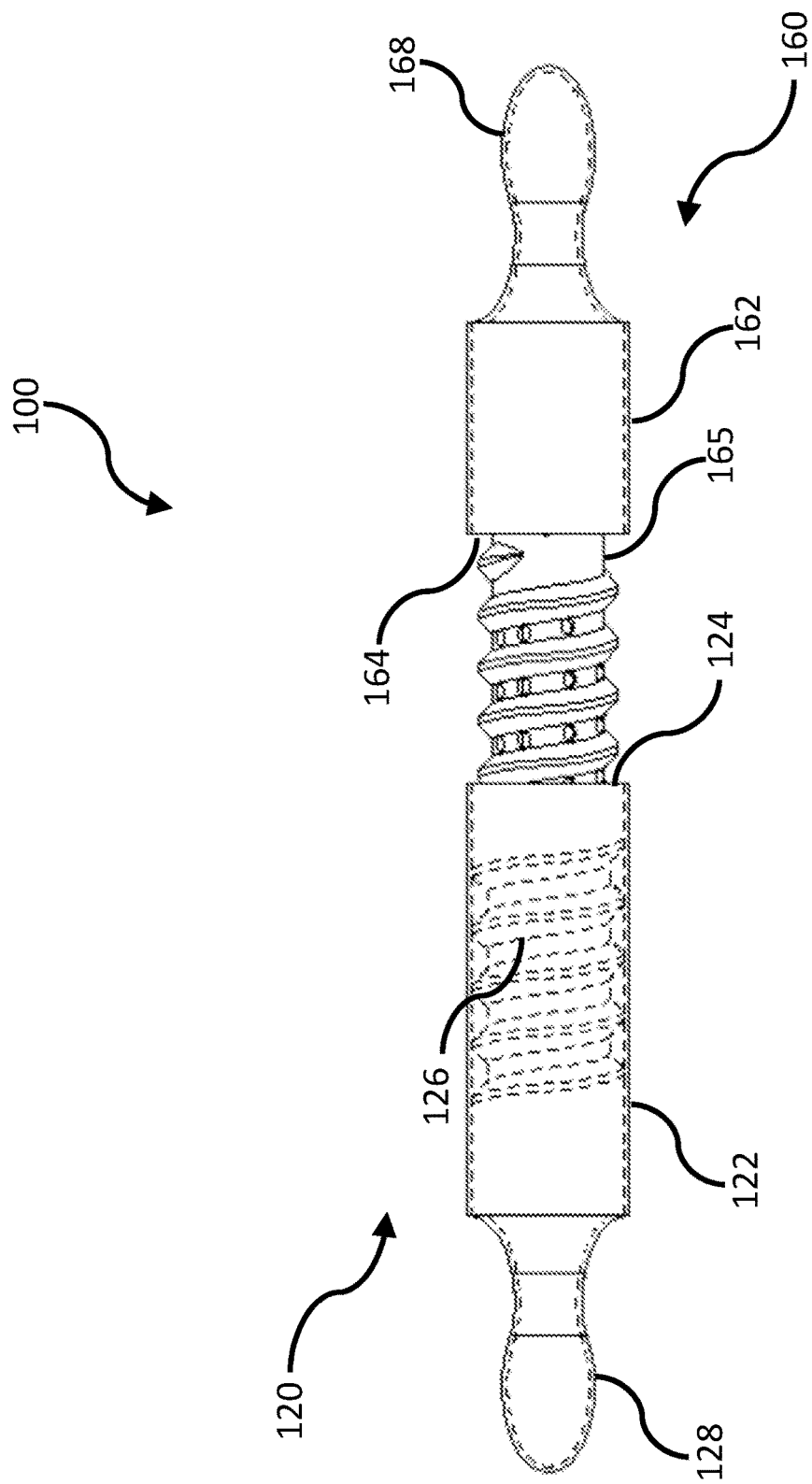
FIG. 2 illustrates a front view of the example dispensing rolling pin of FIG. 1 in a dispensing configuration.

Exterior surface 165 of second rollable member 160 and interior surface 126 of first rollable member 120 cooperate to vary and/or control a length or area of exterior surface 165 received within interior surface 126. As a result, exterior surface 165 and interior surface 126 cooperate to selectively and/or controllably expose one or more of perforations 167 to surroundings (FIGS. 1 & 2).

Further, the less length or area of exterior surface 165 received in interior surface 126, the more perforations 167 are open to surroundings and the greater the capacity to dispense material through perforations 167. In an example, interior chamber 126 and exterior surface 165 may cooperate with respective mating threads 129 and threads 169 such that relative rotation between the first and second rollable members in a first direction causes more perforations to be open to surroundings whereas relative rotation therebetween in a second, opposite direction causes fewer perforations to be open to surroundings. Alternatively, relative rotation between the first and second rollable members in the first direction causes the length or area of exterior surface 165 received in interior surface 126 to decrease while relative rotation therebetween in the second direction causes the length or area of exterior surface 165 received in interior surface 126 to increase.

With a first mating surface 124 surrounding entrance 123 of rollable member 120 and a second mating surface 164 between exterior surface 165 and second pressure surface 162 forming a shoulder, maximum length or area of exterior surface 165 within interior chamber 126 is reached when first mating surface 124 abuts second mating surface 164. With mating surfaces 124 and 164 abutting, dispensing rolling pin 100 may be considered to be in a closed or retaining configuration.

Figure 5:
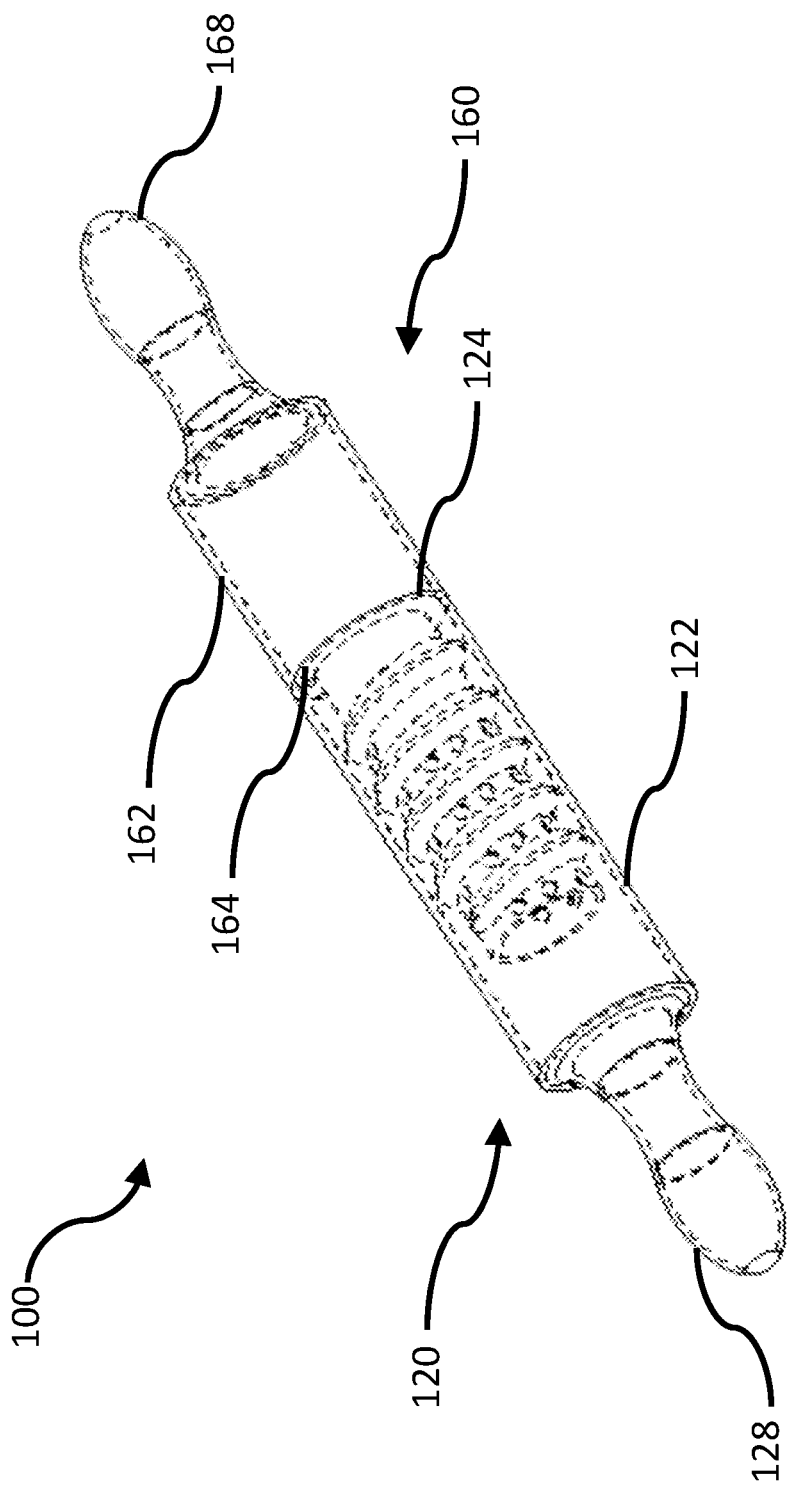
FIG. 5 illustrates a perspective view of an example dispensing rolling pin in a closed (rolling) configuration.
Figure 6:
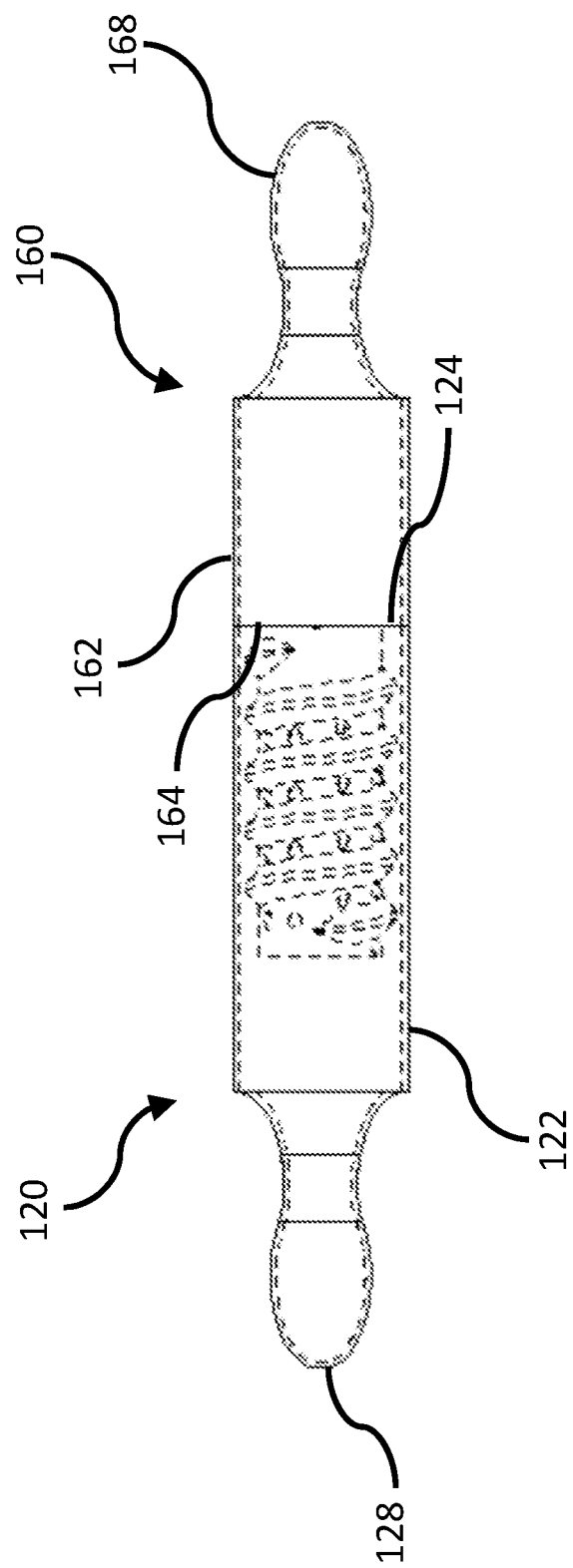
FIG. 6 illustrates a front view of the example dispensing rolling pin of FIG. 5 in a closed configuration.
Figure 7:
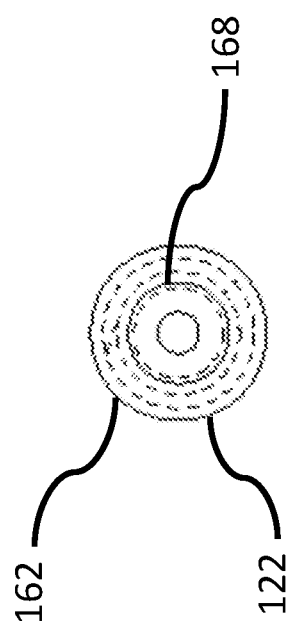
FIG. 7 illustrates a side view of the example dispensing rolling pin of FIGS. 5 & 6.

Referring to FIGS. 5-7, first and second pressure surfaces 122 and 162 may be configured to effectively provide a single, continuous pressure surface with the dispensing rolling pin 100 in the closed or retaining configuration. In practice, a small crack or space may persist after first and second rollable members 120 and 160 are relatively twisted closed. However, any such crack or space would be insufficient to form undesirable raised lines in dough being rolled. In an example, any remaining space is less than 1.0 cm and, preferably, less than 0.5 cm.

A first handle 128 extends from first rollable member 120 opposite interior chamber entrance 123. First handle 128 defines a first longitudinal axis 201 projecting away from first pressure surface 122 and continuing through the centerline of first rollable member 120. A second handle 168 extends from second rollable member 160 opposite interior chamber entrance 163. Second handle 168, which is spaced apart from exterior surface 165 at least by second pressure surface 162, defines a second longitudinal axis 203 projecting away from first pressure surface 162 and continuing through the centerline of the second rollable member. First and second handles 128 and 168 may be elongate. Varying or controlling the length or area of exterior surface 165 received within interior surface 126 also varies the overall length of the dispensing rolling pin, for example, between distal ends of handles 128 and 168.

With external surface 165 engaged with interior chamber 126, first and second longitudinal axes 201 and 203 may be approximately or substantially colinear so that any angle between the longitudinal axes is unnoticeable to the ordinary observer and does not adversely impact the function of the dispensing rolling pin to smooth, flatten and/or spread dough or similar substance.

System 100 may further include a lock configured to selectively prevent relative rotation of first and second rollable members 120 and 160. For example, a raised dot 171 may be provided on one of the first and second mating surfaces 124 and 164 and a divot 172 may be provided on the other of the first and second mating surfaces 124 and 164 and configured for receiving raised dot 171. Twisting first rollable member 120 relative to second rollable member 160 to increase the length or area of external surface 165 within internal surface 126, eventually leads to dot 171 being received within divot 172. With divot 171 in receipt of dot 172, first rollable member 120 and second rollable member 160 are locked against inadvertent relative rotation. However, application by a user of a small relative twisting force or torque can overcome the resistance to turning by cooperation of divot 171 and dot 172 so that first rollable member 120 and second rollable member 160 may be relatively rotated and the length or area of external surface 165 within internal surface 126 may be reduced. In an example, raised dot 171 and/or divot 172 are formed from resilient materials which will deform with sufficient relative twisting force to allow raised dot 171 to pass from divot 172. In a further example, raised dot 172 and divot 172 are formed from polyethylene or polytetrafluoroethylene.

Components of disclosed dispensing rolling pins, including first and second pressure surfaces 122 and 162, may take any of a variety of shapes, profiles, configurations or sizes suitable for relatively evenly rolling out a substance such as one having doughy consistency. First and second pressure surfaces 122 and 162 may take any of a variety textures including smooth. In an example, rollable member 160 may include lines or other markings as a scale against which a user may measure the volume of substance held in interior chamber 166. In a further example, a scale may be included on an interior surface of interior chamber 166, on external surface 165 or on pressure surface 162.

In an example, first and second rollable members 120 and 160 are generally elongate such that a length dimension (for example, along longitudinal axes 201 and 203) is substantially greater than a width and/or height dimension. In an example, first and second pressure surfaces 122 and 162 are cylindrical with circular bases having approximately equal diameters so as to evenly roll out a substance. In a further example, the diameters of first and second rollable members 120 and 160 are from 3.8 to 7.6 cm.

In an example, the length of the first pressure surface may be about twice as long as the length of the second pressure surface. For example, the first pressure surface may be 16.5 cm long while the second pressure surface is 8.3 cm and each of the first and second handles are 12.7 cm long. In an example, the total length of dispensing rolling pin 100 between ends of handles 128 and 168 is 45.8 cm. Provided measurements are approximations within normal manufacturing tolerances.

Disclosed dispensing rolling pins, pressure-applying systems and/or powder-dispensing systems 100 may be formed from any of a variety of rigid, durable, easily washable materials and may be formed by any of a variety of manufacturing techniques. In an example, disclosed systems are formed from food-grade, washable plastic. In a further example, disclosed systems are formed from a transparent or translucent material. In an example, components of disclosed systems may be formed by additive manufacturing such as 3D printing.

Disclosed dispensing rolling pins, pressure-applying systems and/or powder-dispensing systems 100 facilitate a method for dispensing. The method includes providing a first rollable member and a second rollable member.

A substance such as a flour or meal is provided to an interior chamber internal to a pressure surface of the second rollable member, an exterior surface external to the interior chamber of the second rollable member is engaged with an internal surface of an interior chamber of the first rollable member and the first rollable member is twisted relative to the second rollable member in a first direction until a pressure surface of the first rollable member and a pressure surface of the second rollable member form a single, continuous pressure surface.

The first rollable member may be twisted relative to the second rollable member in the first direction until a first mating surface surrounding the entrance of the interior chamber abuts a second mating surface between the exterior surface and second pressure surface. Further, the first rollable member may be twisted relative to the second rollable member in the first direction until a raised dot engages a divot to lock the first rollable member to the second rollable member.

The exterior surface external to the interior chamber of the second rollable member may be engaged with an internal surface of an interior chamber of the first rollable member and the first rollable member such that a first longitudinal axis defined by the first handle and a second longitudinal axis defined by the second handle are substantially colinear. In an example, the exterior surface is engaged with the internal surface by mating threads.

Figure 8:
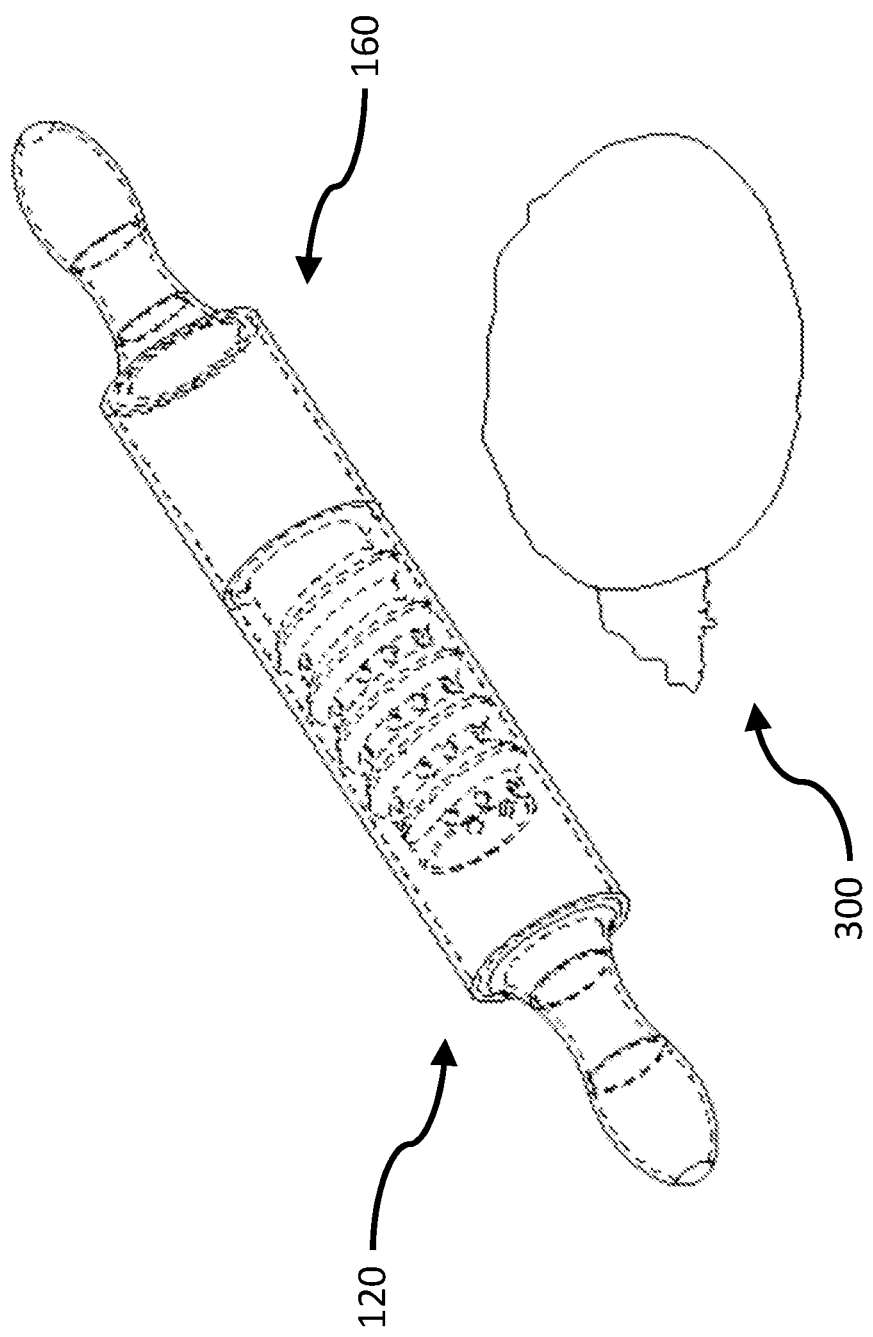
FIG. 8 illustrates the dispensing rolling pin of FIGS. 1-7 in use rolling over example dough.

Referring to FIG. 8, the single, continuous pressure surface of the closed dispensing rolling pin is applied to a substance to be spread and flattened and the engaged first and second rollable members are rolled over the substance.

A user may very briefly interrupt the rolling over the substance to dispense the substance within the interior chamber. The first rollable member is twisted relative to the second rollable member in a second direction to achieve a dispensing configuration in which some of the perforations are uncovered or otherwise exposed to the environment/ surroundings and/or the substance to be spread and flattened as shown by way of example in FIG. 9.

Additionally/alternatively, twisting the may be performed such that the first mating surface is distanced from the second mating surface. A user may lift the dispensing rolling pin up away from the substance to be spread and flattened before relative rotation of the first and second rollable members or, in some cases, it may be possible to twist the first and second rollable members relative to one another without lifting the dispensing rolling pin away from the substance being spread and flattened.

Figure 9:
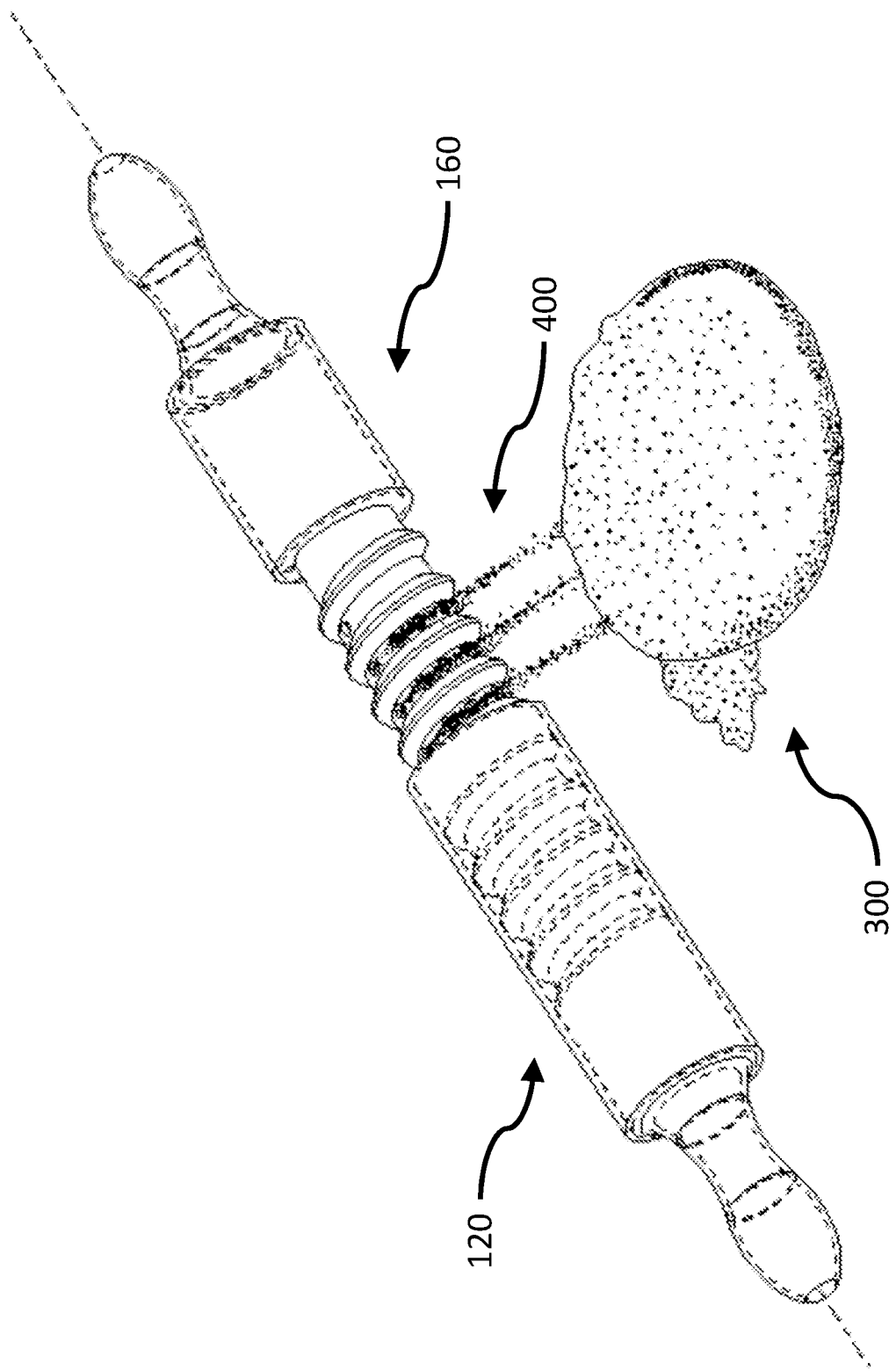
FIG. 9 illustrates the dispensing rolling pin of FIGS. 1-7 in use dispensing flour onto example dough.

Referring to FIG. 9, the substance may then be dispensed from the interior chamber through the perforations. The greater the amount of relative twisting between the first and second rollable members, the greater the number of perforations open to the surroundings and the greater the quantity of powdered substance that will be dispensed.

With the substance dispensed, the first rollable member is again twisted relative to the second rollable member in the first direction until the perforations are covered and/or separated from surroundings and the first and second pressure surfaces form the single, continuous pressure surface (see FIGS. 5-9, for example).

The actions described above are only illustrative and other alternatives can also be provided where one or more actions are added, one or more actions are removed, or one or more actions are provided in a different sequence without departing from the scope of the claims herein.

Embodiments of the disclosure are susceptible to being used for various purposes, including, though not limited to, enabling users to roll dough and dispense flour from a single tool directly onto the dough saving time and clean-up. Further, embodiments of the disclosure are susceptible to being used for dispensing substances other than flour and meal such as other powders, liquids or gels and/or for rolling or smoothing substances other than dough such as putty.

Modifications to embodiments of the disclosure described in the foregoing are possible without departing from the scope of the disclosure as defined by the accompanying claims. Expressions such as "including", "comprising", "incorporating", "consisting of", "have", "is" used to describe and claim disclosed features are intended to be construed in a non-exclusive manner, namely allowing for items, components or elements not explicitly described also to be present. Reference to the singular is also to be construed to relate to the plural.

What is claimed is:

1. A dispensing rolling pin, comprising:
   a first rollable, pressure-applying member having:
      a first handle at a first end;
      a first pressure surface adjacent to the first handle;
      a threaded interior chamber internal to the first pressure surface; and
      an entrance to the threaded interior chamber at a second end opposite the first end and spaced from the first handle by at least a length of the first pressure surface; and
   a second rollable, pressure-applying member having:
      a second pressure surface;
      an interior chamber;
      adjacent to a first end, a threaded exterior surface external to the interior chamber and configured for mating engagement with the threaded interior chamber;
      a plurality of perforations formed through the threaded exterior surface into the interior chamber of the second rollable, pressure-applying member; and
      a second handle at a second end opposite the first end of the second rollable, pressure-applying member and spaced from the threaded exterior surface at least by the second pressure surface;
   wherein (i) in a first configuration, the threaded exterior surface is fully inserted into the threaded interior chamber where the first pressure surface and the second pressure surface form a single, continuous pressure surface; (ii) in a second configuration, the threaded exterior surface is partially inserted into the threaded interior chamber where one or more of the plurality of perforations are uncovered; and (iii) the dispensing rolling pin being rollable in the first configuration and the second configuration.

2. A powder-dispensing system, comprising:
   a first rollable member having:
      a first pressure surface;
      a threaded interior chamber internal to the first pressure surface; and
      an entrance to the threaded interior chamber; and
   a second rollable member having:
      a second pressure surface;
      an interior chamber internal to the second pressure surface;
      a threaded exterior surface external to the interior chamber and configured for mating engagement with the threaded interior chamber; and
      a plurality of perforations through the threaded exterior surface into the interior chamber of the second rollable member;
   wherein (i) in a first configuration, the threaded exterior surface is fully inserted into the threaded interior chamber where the first pressure surface and the second pressure surface form a single, continuous pressure surface; (ii) in a second configuration, the threaded exterior surface is partially inserted into the threaded interior chamber where one or more of the plurality of perforations are uncovered; and (iii) the dispensing rolling pin being rollable in the first configuration and the second configuration.

3. The system as set forth in claim 2, wherein the first rollable member further comprises a first handle opposite the interior chamber entrance.

4. The system as set forth in claim 3, wherein the second rollable member further comprises a second handle opposite the exterior surface.

5. The system as set forth in claim 4, wherein the first handle is and defines a first longitudinal axis, the second handle is and defines a second longitudinal axis and, with the threaded exterior surface engaged with the threaded interior chamber of the first rollable member, the first and second longitudinal axes are substantially colinear.

6. The system as set forth in claim 2, wherein the threaded exterior surface of the second rollable member and the threaded interior chamber of the first rollable member cooperate to vary a length or area of the threaded exterior surface of the second rollable member received within the threaded interior chamber of the first rollable member.

7. The system as set forth in claim 2, wherein the threaded exterior surface of the second rollable member and the threaded interior chamber of the first rollable member cooperate to selectively expose one or more of the perforations to surroundings.

8. The system as set forth in claim 2, further comprising a lock configured to selectively prevent relative rotation of the first and second rollable members.

9. The system as set forth in claim 2, further comprising a first mating surface surrounding the entrance of the first rollable member.

10. The system as set forth in claim 9, further comprising, between the threaded exterior surface and the second pressure surface, a second mating surface configured to abut the first mating surface.

11. The system as set forth in claim 10, wherein the first and second pressure surfaces are configured to provide the single, continuous pressure surface with the first and second mating surfaces abutting.

12. The system as set forth in claim 10, further comprising a raised dot on one of the first and second mating surfaces and a divot on the other of the first and second mating surfaces and configured for receiving the raised dot.

13. The system as set forth in claim 2, wherein the first pressure surface and the second pressure surface are each cylindrical.

14. A method for dispensing, comprising:
   providing a first rollable, pressure-applying member having:
      a first handle at a first end;
      a first pressure surface adjacent to the first handle;
      a threaded interior chamber internal to the first pressure surface; and
      an entrance to the threaded interior chamber at a second end opposite the first end and spaced from the first handle by at least the first pressure surface; and
   providing a second rollable, pressure-applying member having:
      a second pressure surface;
      an interior chamber internal to the second pressure surface;
      adjacent to a first end, a threaded exterior surface configured for interlocking engagement with the threaded interior chamber;
      a plurality of perforations through the threaded exterior surface into the interior chamber of the second rollable, pressure-applying member; and
      a second handle at a second end opposite the first end of the second rollable, pressure-applying member and spaced from the threaded exterior surface at least by the second pressure surface;

providing a substance to the interior chamber internal to the second pressure surface;

engaging the external threads with the internal threads and twisting the first rollable, pressure-applying member relative to the second rollable, pressure-applying member in a first direction until the first and second pressure surfaces form a single, continuous pressure surface;

applying the single, continuous pressure surface to a substance to be spread and flattened and rolling the threadedly engaged first and second rollable, pressure-applying members over the substance;

twisting the first rollable pressure-applying member relative to the second rollable, pressure-applying member in a second direction until one or more of the perforations are uncovered;

dispensing the substance from the interior chamber through the one or more uncovered perforations; and twisting the first rollable, pressure-applying member relative to the second rollable, pressure-applying member in the first direction until the perforations are covered and the first and second pressure surfaces form the single, continuous pressure surface.

15. The method as set forth in claim 14, wherein the twisting the first rollable, pressure-applying member relative to the second rollable, pressure-applying member in the second direction further comprises twisting such that a first mating surface surrounding the entrance of the interior chamber is distanced from a second mating surface between the threaded exterior surface and second pressure surface.

16. The method as set forth in claim 14, wherein the twisting the first rollable pressure-applying member relative to the second rollable, pressure-applying member in the first direction until the first and second pressure surfaces form a single, continuous pressure surface further comprises twisting until a first mating surface surrounding the entrance of the interior chamber abuts a second mating surface between the threaded exterior surface and second pressure surface.

17. The method as set forth in claim 14, wherein the twisting the first rollable, pressure-applying member relative to the second rollable, pressure-applying member in the first direction until the first and second pressure surfaces form a single, continuous pressure surface further comprises twisting until a raised dot engages a divot to lock the first rollable, pressure-applying member to the second rollable, pressure-applying member.

18. The method as set forth in claim 14, wherein twisting the first rollable pressure-applying member relative to the second rollable, pressure-applying member in the second direction further comprises twisting such that a first mating surface surrounding the entrance of the interior chamber is spaced apart from a second mating surface between the threaded exterior surface and second pressure surface.

19. The method as set forth in claim 14, wherein engaging the external threads with the internal threads further comprises engaging such that a first longitudinal axis defined by the first handle and a second longitudinal axis defined by the second handle are substantially colinear.

\* \* \* \* \*